(12) United States Patent
Lee et al.

(10) Patent No.: US 8,368,819 B2
(45) Date of Patent: Feb. 5, 2013

(54) REMOTE CONTROL SYSTEM AND METHOD OF TELEVISION CONTROL

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 138 days.

(21) Appl. No.: 13/008,821

(22) Filed: Jan. 18, 2011

(65) Prior Publication Data

US 2011/0267549 A1 Nov. 3, 2011

(30) Foreign Application Priority Data

Apr. 30, 2010 (TW) .............................. 99113798 A

(51) Int. Cl.
*H04N 5/44* (2006.01)
(52) U.S. Cl. ....................................................... 348/734
(58) Field of Classification Search .................. 348/734, 348/725; 345/158; 340/12.22, 12.24, 12.3, 340/12.31; *H04N 5/44*
See application file for complete search history.

(56) References Cited

U.S. PATENT DOCUMENTS

| | | | | |
|---|---|---|---|---|
| 6,498,628 | B2 * | 12/2002 | Iwamura | 348/734 |
| 6,501,515 | B1 * | 12/2002 | Iwamura | 348/734 |
| 2012/0069168 | A1 * | 3/2012 | Huang et al. | 345/158 |

* cited by examiner

*Primary Examiner* — Sherrie Hsia
(74) *Attorney, Agent, or Firm* — Altis Law Group, Inc.

(57) ABSTRACT

A remote control method controls a television (TV) set to perform functions using an electronic device. The method controls a camera connected with the electronic device to capture an image in front of the TV set when the TV set is turned on. The method analyzes the captured image to determine whether a hand image of a user exists in the captured image, and extracts the hand image from the captured image upon the condition that the hand image exists in the captured image to determine a hand sign of the user according to the extracted hand image. The method generates a remote control signal for controlling the TV set according to the determined hand sign, and controls the TV set to perform a function according to the remote control signal.

18 Claims, 5 Drawing Sheets

REMOTE CONTROL SYSTEM AND METHOD OF TELEVISION CONTROL

BACKGROUND

1. Technical Field

Embodiments of the present disclosure relate generally to remote control systems and methods, and more particularly to a system and method for remotely controlling a television.

2. Description of Related Art

Television (TV) sets that are controlled by a remote control are well known in the art. For example, a user can control a TV set to switch from one channel to another channel by pressing buttons of the remote control. A typical remote control includes a frame to support a plurality of mechanical function buttons that execute predetermined functions. The more functions the remote control has, the more buttons are disposed on the remote control. Therefore, the frame should be designed as large as possible to hold the function buttons. However, it is inconvenient for the user to operate remote controls with ever increasing function buttons to operate the TV set.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
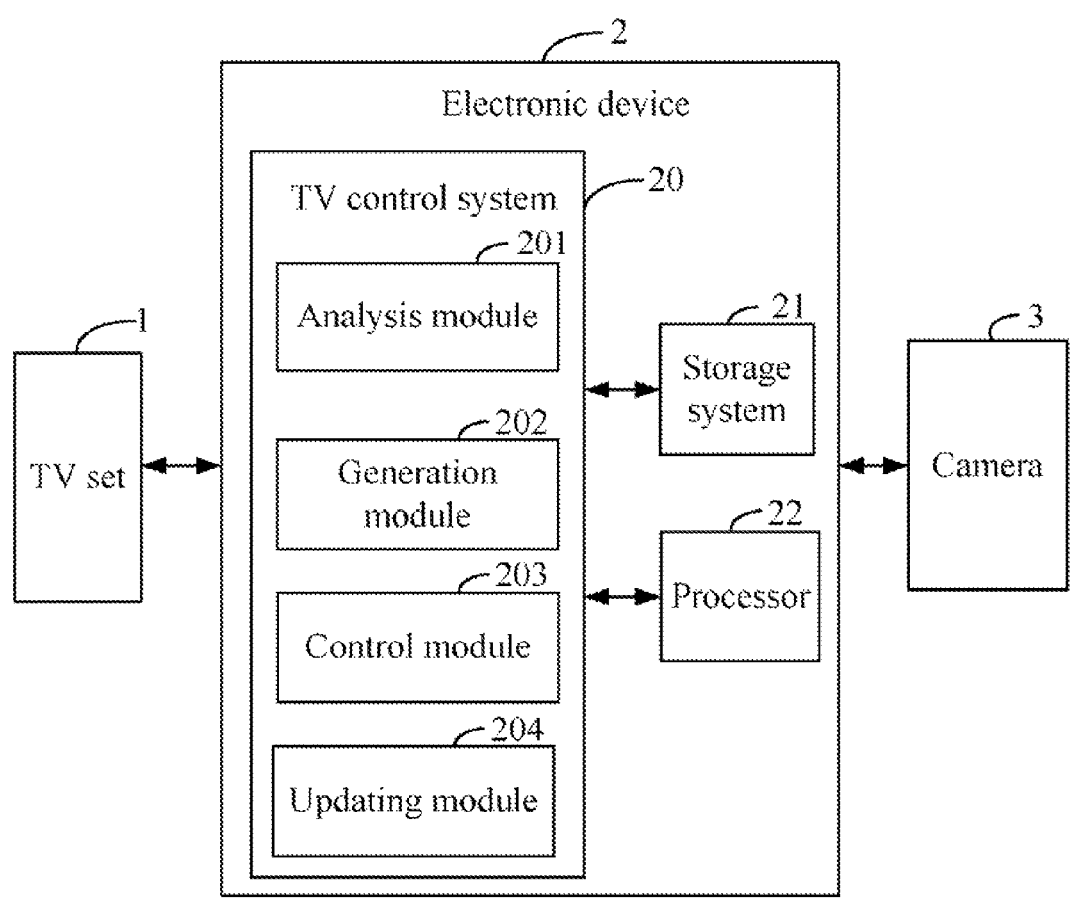
FIG. 1 is a schematic diagram of one embodiment of an electronic device connected with a TV set and a camera.

FIG. 1 is a schematic diagram of one embodiment of an electronic device 2 connected with a television (TV) set 1 and a camera 3. In the embodiment, the electronic device 2 can be used to remotely control the TV set 1 to perform various functions, such as switching from one TV channel to another TV channel, for example. The electronic device 2 includes a TV control system 20, a storage system 21, and a processor 22. It should be apparent that FIG. 1 shows only one example of an architecture for electronic device 2 and may include more or fewer components than shown, or a different configuration of the various components in other embodiments. In one embodiment, the electronic device 1 may be a digital connector, or other computing device for controlling the TV set 1.

Figure 2:
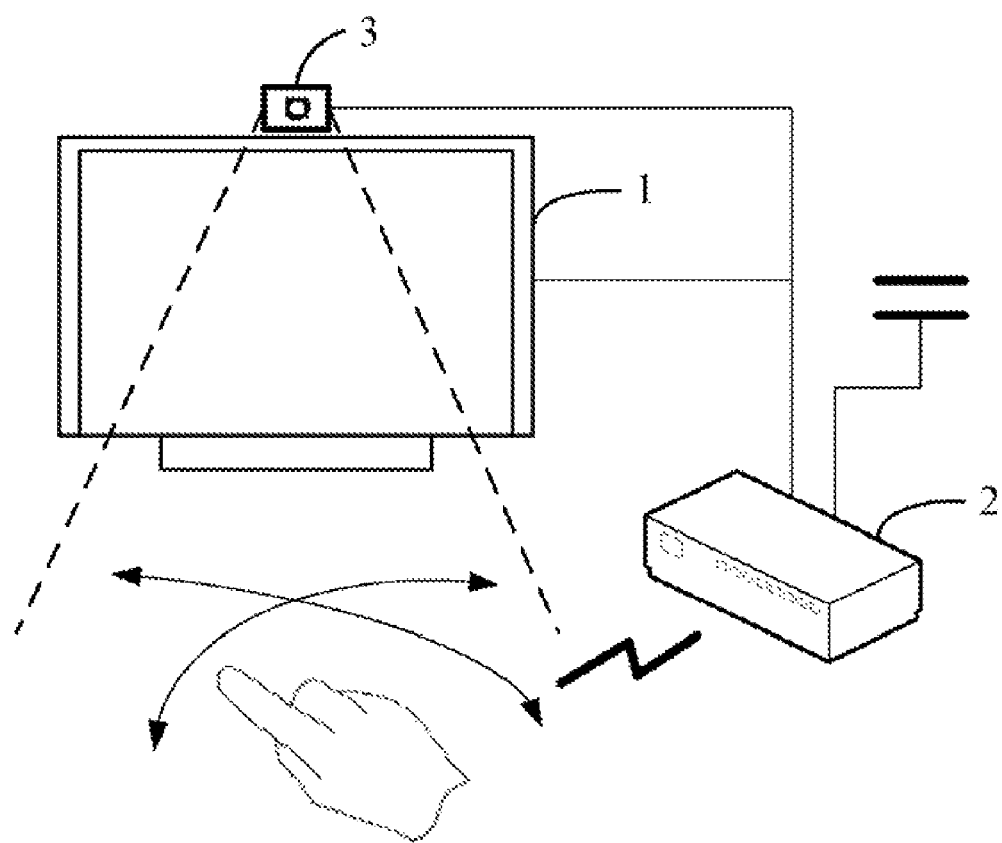
FIG. 2 shows a schematic diagram illustrating one example of detail connections of the TV set, the electronic device, and the camera.
Figure 3:
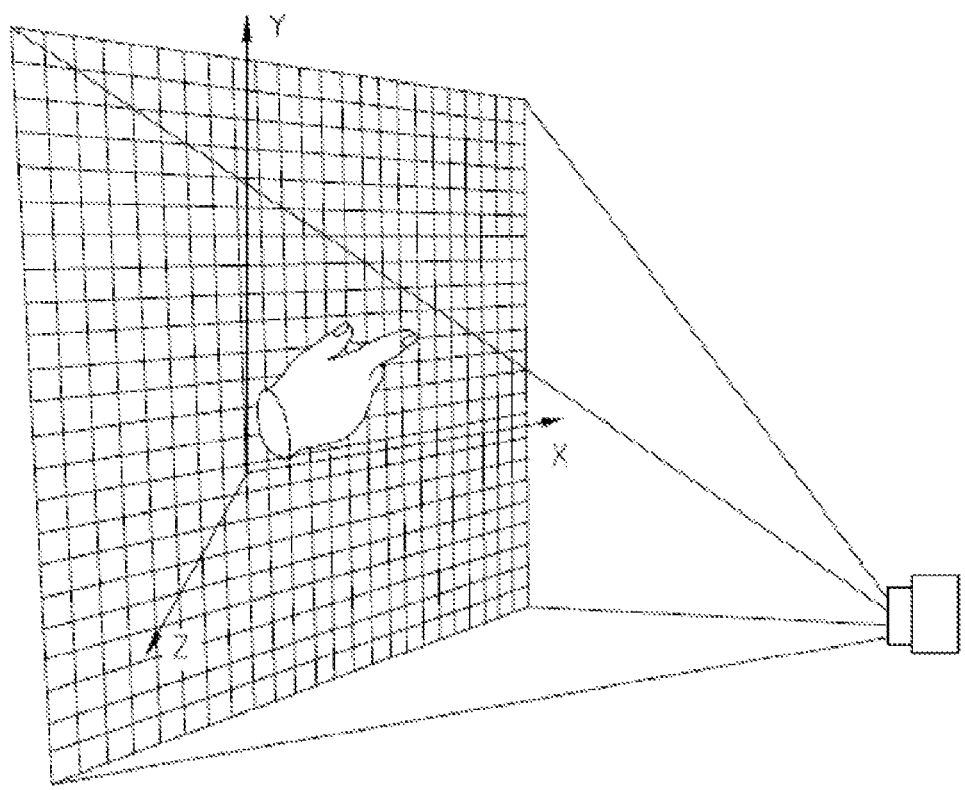
FIG. 3 is a schematic diagram illustrating an example of a hand image in front of the TV set.

FIG. 2 shows a schematic diagram illustrating one example of detail connections of the TV set 1, the electronic device 2, and the camera 3. The electronic device 2 is connected with the TV set 1 and the camera 3 through one or more electronic or wireless connections. The camera 3 may be a time of flight (TOF) camera mechanically located on the TV set 1 capable of capturing images in front of the TV set 1. In one embodiment, the images may include image data and distance information between the camera 3 and an object captured by the camera 3. Referring to FIG. 3, the camera 3 captures an image of a hand of a user in front of the TV set 1. The hand image can be described in a three dimension (3D) coordinate system that include X-Y coordinate image data, and Z-coordinate distance data. In one embodiment, the X-coordinate value can represent a width of the hand image, such as 10 cm. The Y-coordinate value can represent a height of the hand image, such as 40 cm. The Z-coordinate distance data can represent a distance between the camera 11 and the hand, which can be calculated by analyzing the hand image. The captured images are analyzed by the TV control system 20 to control the TV set 1 to perform corresponding functions according to the analyzed result. Details of the analyzed method are provided below.

The TV control system 20 may include a plurality of functional modules comprising one or more computerized instructions that are stored in the storage system 21, and executed by the processor 22 to perform operations of the electronic device 2. The storage system 21 may be an internal storage device, such as a random access memory (RAM) for temporary storage of information and/or a read only memory (ROM) for permanent storage of information. The storage system 21 may also be an external storage device, such as a hard disk, a storage card, or a data storage medium. The processor 22 runs various computerized instructions stored in the storage system 21 to control the TV set 1 to perform various functions.

In one embodiment, the TV control system 20 includes an analysis module 201, a generation module 202, a control module 203, and an updating module 204. One or more computerized codes of the function modules may be stored in the storage system 21 and executed by the processor 22. In general, the word "module," as used herein, refers to logic embodied in hardware or firmware, or to a collection of software instructions, written in a programming language. The software instructions in the modules may be embedded in firmware, such as an erasable programmable read only memory (EPROM). The modules described herein may be implemented as either software and/or hardware modules and may be stored in any type of computer-readable medium or other storage device.

The analysis module 201 is operable to control the camera 3 to capture an image in front of the TV set 1 in real time when the TV set 1 is turned on, and analyze the captured image to determine whether a hand image of a user (i.e., an image of a hand of a user) exists in the captured image. Upon the condition that the hand image exists in the captured image, the analysis module 201 is further operable to extract the hand image from the captured image, and determine a hand sign of the user according to the extracted hand image.

Figure 5:
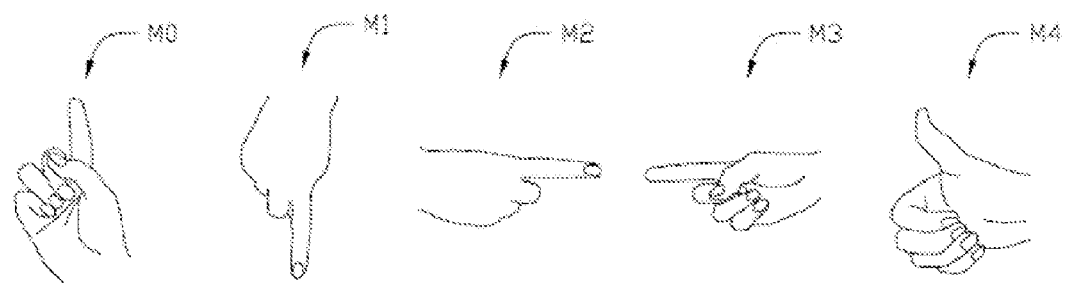
FIG. 5 is a schematic diagram illustrating an example of various hand signs capable of remotely controlling the TV set.

In one embodiment, the analysis module 201 analyzes the captured image by comparing the captured image with a plurality of standard 3D hand models, and determines whether the hand image exists in the captured image according to the comparison. The standard 3D hand models may be pre-collected by capturing a plurality of hand images of the user using the camera 3, and stored in the storage system 21. The standard 3D hand models may be stored in one or more databases of the storage system 21 according to the hand sign of each of the standard 3D hand models. The hand sign may be, for example, a thumb pointing in the up direction (e.g., M4 of FIG. 5), a forefinger pointing in the left direction (e.g., M3 of FIG. 5), the forefinger pointing in the right direction (e.g., M2 of FIG. 5), the forefinger pointing in the up direction (e.g., M0 of FIG. 5), and the forefinger pointing in the down direction (e.g., M1 of FIG. 5).

In one embodiment, the standard 3D hand models of which the hand sign is a thumb pointing in the up direction are stored in a first database. The standard 3D hand models of which the hand sign is the forefinger pointing in the left direction are stored in a second database. The standard 3D hand models of which the hand sign is the forefinger pointing in the right direction are stored in a third database. The standard 3D hand models of which the hand sign is the forefinger pointing in the up direction are stored in a fourth database. The standard 3D hand models of which the hand sign is the forefinger pointing in the down direction are stored in a fifth database. Thereupon, the analysis module 201 may determine the hand sign of the user by comparing the extracted hand image with the standard 3D hand models of the databases.

The generation module 202 is operable to generate a remote control signal for controlling the TV set 1 according to the determined hand sign. In one embodiment, the generation module 202 generates a first signal for changing a current TV channel of the TV set 1 up when the hand sign is the forefinger pointing in the right direction, a second signal for changing the current TV channel down when the hand sign is the forefinger pointing in the left direction, a third signal for activating a TV program menu of the TV set 1 when the hand sign is the forefinger pointing in the up direction, a fourth signal for terminating the TV program menu when the hand sign is the forefinger pointing in the down direction, and a fifth signal for starting a TV program that is selected from the TV program menu when the hand sign is the thumb pointing in the up direction.

The control module 203 is operable to control the TV set 1 to perform a corresponding function according to the remote control signal. For example, if the remote control signal is the first signal, the control module 203 changes the current TV channel up. If the remote control signal is the second signal, the control module 203 changes the current TV channel down. If the remote control signal is the third signal, the control module 203 controls the TV set 1 to drive the TV program menu for the user to select a TV program from the TV program menu. If the remote control signal is the fourth signal, the control module 203 controls the TV set 1 to terminate the TV program menu. If the remote control signal is the fifth signal, the control module 203 controls the TV set 1 to start a TV program that is selected from the TV program menu.

The updating module 204 is operable to update the TV program menu by downloading TV program names from a TV network system, and store the updated TV program menu into the storage system 21. In one embodiment, the TV network system provides different TV programs by a broadcast television provider, such as the National Broadcasting Company (NBC), or Canadian Broadcasting Corporation (CBC), for example. A user may search the TV program menu for a favorite program, and switch the current TV channel to the channel of the favorite program by making a corresponding hand sign towards the camera 3.

Figure 4:
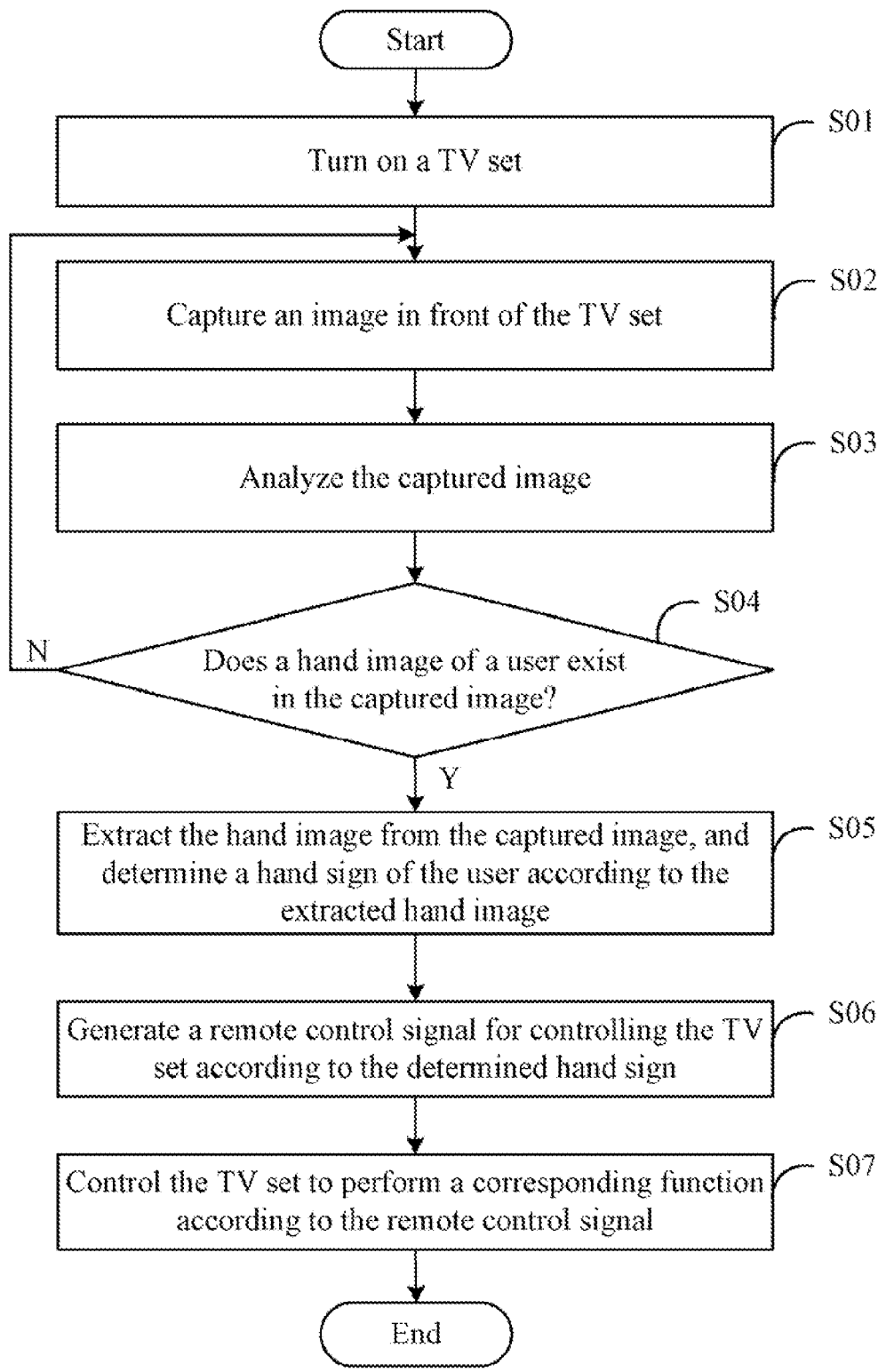
FIG. 4 a flowchart of one embodiment of a method for remotely controlling the TV set using the electronic device of FIG. 1.

FIG. 4 is a flowchart of one embodiment of a method for remotely controlling a TV set using the electronic device 2 of FIG. 1. In the embodiment, the control method can remotely control the TV set 1 to perform various functions. Depending on the embodiment, additional blocks may be added, others removed, and the ordering of the blocks may be changed.

In block S01, the electronic device 2 is activated when the TV set 1 is turned on.

In block S02, the analysis module 201 controls the camera 3 to capture an image in front of the TV set 1 in real time.

In block S03, the analysis module 201 analyzes the captured image by comparing the captured image with a plurality of standard 3D hand models stored in the storage system 21. As described above, the standard 3D hand models may be pre-collected according to a plurality of hand signs of a user uses in front of the electronic device 2 to control the TV set 1.

In block S04 the analysis module 201 determines whether a hand image exists in the captured image according to the analysis result. If the hand image exists in the captured image, block S05 is implemented. Otherwise, if the hand image does not exist in the captured image, block S02 is repeated. The analysis module 201 may analyze the captured image to determine whether the hand image exists in the captured image using the method as described above.

In block S05, the analysis module 201 extracts the hand image from the captured image, and determines a hand sign of the user according to the extracted hand image. In one embodiment, the hand sign may be, for example, a thumb pointing in the up direction (e.g., M4 of FIG. 5), a forefinger pointing in the left direction (e.g., M3 of FIG. 5), the forefinger pointing in the right direction (e.g., M2 of FIG. 5), the forefinger pointing in the up direction (e.g., M0 of FIG. 5), and the forefinger pointing in the down direction (e.g., M1 of FIG. 5). The hand sign may be determined by comparing the extracted hand image with the standard 3D hand models stored in the databases of the storage system 21. Details of which are described above.

In block S06, the generation module 202 generates a remote control signal for controlling the TV set 1 according to the determined hand sign. For example, the generation module 202 generates a first signal for changing a current TV channel of the TV set 1 up when the hand sign is the forefinger pointing in the right direction, a second signal for changing the current TV channel down when the hand sign is the forefinger pointing in the left direction, a third signal for activating a TV program menu of the TV set 1 when the hand sign is the forefinger pointing in the up direction, a fourth signal for terminating the TV program menu when the hand sign is the forefinger pointing in the down direction, and a fifth signal for starting a TV program that is selected from the TV program menu when the hand sign is the thumb pointing in the up direction.

In block S07, the control module 203 controls the TV set 1 to perform a corresponding function according to the remote control signal. For example, if the remote control signal is the first signal, the control module 203 changes the current TV channel of the TV set 1 up. If the remote control signal is the second signal, the control module 203 changes the current TV channel down. If the remote control signal is the third signal, the control module 203 drives the TV program menu of the TV set 1 for the user to select a TV program from the TV program menu. If the remote control signal is the fourth signal, the control module 203 terminates the TV program menu. If the remote control signal is the fifth signal, the control module 203 controls the TV set 1 to start a TV program that is selected from the TV program menu.

In some embodiments, the control method may further update the TV program menu in real time from the TV network system. In detail, the updating module 204 updates the TV program menu by downloading TV program names from a TV network system, and stores the updated TV program menu into the storage system 21. Thereby, the user can search the TV program menu to select a favorite program, and switch from the current channel to the channel of the favorite program by making a corresponding hand sign towards the camera 3.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device for remotely controlling a television (TV) set, the electronic device comprising:
   at least one processor;
   a storage system; and
   one or more programs stored in the storage system and being executable by the at least one processor, the one or more programs comprising:
   an analysis module operable to control a camera electronically or wirelessly connected with the electronic device to capture an image in front of the TV set when the TV set is turned on, analyze the captured image to determine whether a hand image of a user exists in the captured image, extract the hand image from the captured image upon the condition that the hand image exists in the captured image, and determine a hand sign of the user according to the extracted hand image;
   a generation module operable to generate a remote control signal for controlling the TV set according to the determined hand sign, the generation module further generate a first signal for changing a current TV channel of the TV set up on condition that the hand sign is a forefinger pointing in the right direction; and
   a control module operable to control the TV set to perform a function according to the remote control signal.

2. The electronic device according to claim 1, wherein the analysis module analyzes the captured image by comparing a plurality of standard 3D hand models stored in the storage system, and determines whether the hand image exists in the captured image according to the comparison.

3. The electronic device according to claim 1, wherein the generation module generates a second signal for changing the current TV channel down on condition that the hand sign is the forefinger pointing in the left direction.

4. The electronic device according to claim 1, wherein the generation module generates a third signal for activating a TV program menu of the TV set on condition that the hand sign is the forefinger pointing in the up direction.

5. The electronic device according to claim 1, wherein the generation module generates a fourth signal for terminating the TV program menu of the TV set on condition that the hand sign is the forefinger pointing in the down direction.

6. The electronic device according to claim 1, wherein the generation module generates a fifth signal for starting a TV program that is selected from the TV program menu on condition that the hand sign is a thumb pointing in the up direction.

7. The electronic device according to claim 1, wherein the one or more programs further comprises:
   an updating module operable to update the TV program menu by downloading TV program names from a TV network system, and stores the updated TV program menu into the storage system.

8. The electronic device according to claim 1, wherein the camera is a time of flight (TOF) camera that is mechanically located on the TV set.

9. A method for remotely controlling a television (TV) set using an electronic device, the method comprising:
   controlling a camera electronically or wirelessly connected with the electronic device to capture an image in front of the TV set when the TV set is turned on;
   analyzing the captured image to determine whether a hand image of a user exists in the captured image;
   extracting the hand image from the captured image upon the condition that the hand image exists in the captured image, and determining a hand sign of the user according to the extracted hand image;
   generating a remote control signal for controlling the TV set according to the determined hand sign, wherein the generation of the remote control signal comprises generating a first signal for changing a current TV channel of the TV set up on condition that the hand sign is a forefinger pointing in the right direction; and
   controlling the TV set to perform a function according to the remote control signal.

10. The method according to claim 9, wherein the captured image is analyzed by comparing the captured image with a plurality of standard 3D hand models stored in the storage system, and by determining whether the hand image exists in the captured image according to the comparison.

11. The method according to claim 9, wherein the generation of the remote control signal further comprises:
    generating a second signal for changing the current TV channel down on condition that the hand sign is the forefinger pointing in the left direction;
    generating a third signal for activating a TV program menu of the TV set on condition that the hand sign is the forefinger pointing in the up direction;
    generating a fourth signal for terminating the TV program menu of the TV set on condition that the hand sign is the forefinger pointing in the down direction; and
    generating a fifth signal for starting a TV program that is selected from the TV program menu on condition that the hand sign is a thumb pointing in the up direction.

12. The method according to claim 9, further comprising:
    updating the TV program menu by downloading TV program names from a TV network system; and
    storing the updated TV program menu into the storage system.

13. The method according to claim 9, wherein the camera is a time of flight (TOF) camera that is mechanically located on the TV set.

14. A non-transitory storage medium storing a set of instructions, the set of instructions capable of being executed by a processor of an electronic device, causes the electronic device to perform a method for remotely controlling a television (TV) set, the method comprising:
    controlling a camera electronically or wirelessly connected with the electronic device to capture an image in front of the TV set when the TV set is turned on;
    analyzing the captured image to determine whether a hand image of a user exists in the captured image;
    extracting the hand image from the captured image upon the condition that the hand image exists in the captured image, and determining a hand sign of the user according to the extracted hand image;
    generating a remote control signal for controlling the TV set according to the determined hand sign, wherein the generation of the remote control signal comprises generating a first signal for changing a current TV channel of the TV set up on condition that the hand sign is a forefinger pointing in the right direction; and
    controlling the TV set to perform a function according to the generated remote control signal.

15. The non-transitory storage medium as claimed in claim 14, wherein the captured image is analyzed by comparing the captured image with a plurality of standard 3D hand models stored in the storage system, and by determining whether the hand image exists in the captured image according to the comparison.

16. The non-transitory storage medium as claimed in claim 14, wherein the generation of the remote control signal further comprises:

generating a second signal for changing a current TV channel down on condition that the hand sign is the forefinger pointing in the left direction;

generating a third signal for activating a TV program menu of the TV set on condition that the hand sign is the forefinger pointing in the up direction;

generating a fourth signal for terminating the TV program menu of the TV set on condition that the hand sign is the forefinger pointing in the down direction; and generating a fifth signal for starting a TV program that is selected from the TV program menu on condition that the hand sign is a thumb pointing in the up direction.

17. The non-transitory storage medium as claimed in claim 14, wherein the method further comprises:

updating the TV program menu by downloading TV program names from a TV network system; and storing the updated TV program menu into the storage system.

18. The non-transitory storage medium as claimed in claim 14, wherein the camera is a time of flight (TOF) camera that is mechanically located on the TV set.

* * * * *